(12) United States Patent
Schendel et al.

(10) Patent No.: US 8,876,171 B2
(45) Date of Patent: Nov. 4, 2014

(54) LOCK FOR A LUGGAGE BOX

(75) Inventors: Olav Schendel, Stuttgart (DE); Sascha Costabel, Otisheim (DE)

(73) Assignee: SFS Intec Holding AG, Heerbrugg (CH)

( * ) Notice: Subject to any disclaimer, the term of this patent is extended or adjusted under 35 U.S.C. 154(b) by 451 days.

(21) Appl. No.: 13/380,075

(22) PCT Filed: Dec. 2, 2010

(86) PCT No.: PCT/EP2010/068681
§ 371 (c)(1),
(2), (4) Date: Dec. 22, 2011

(87) PCT Pub. No.: WO2011/069875
PCT Pub. Date: Jun. 16, 2011

(65) Prior Publication Data
US 2012/0091734 A1   Apr. 19, 2012

(30) Foreign Application Priority Data
Dec. 9, 2009   (DE) .......................... 10 2009 044 832

(51) Int. Cl.
| | | |
|---|---|---|
| *E05C 19/10* | (2006.01) | |
| *E05B 63/14* | (2006.01) | |
| *E05B 15/00* | (2006.01) | |
| *E05B 41/00* | (2006.01) | |
| *E05B 53/00* | (2006.01) | |
| *E05C 3/02* | (2006.01) | |
| *B64D 11/00* | (2006.01) | |
| *E05C 3/28* | (2006.01) | |

(52) U.S. Cl.
CPC ............. *E05B 63/143* (2013.01); *E05B 15/004* (2013.01); *E05B 41/00* (2013.01); *E05B 53/003* (2013.01); *B64D 11/003* (2013.01); *E05C 3/28* (2013.01)

USPC ............. 292/116; 292/51; 292/199; 292/213; 292/280

(58) Field of Classification Search
USPC ........... 292/51, 116, 117, 199, 213, 214, 216, 292/218, 280, 126
See application file for complete search history.

(56) References Cited

U.S. PATENT DOCUMENTS 1,320,444 A * 11/1919 Buczynski et al. ............... 70/97
4,958,508 A *  9/1990 Lin ................................. 70/352

(Continued)

FOREIGN PATENT DOCUMENTS

| DE | 202007000112 | 6/2008 |
| GB | 2168748 | 6/1986 |
| GB | 2478459 | * 9/2011 |
| WO | 2006088775 | 8/2006 |

*Primary Examiner* — Carlos Lugo
(74) *Attorney, Agent, or Firm* — Volpe and Koenig, P.C.

(57) ABSTRACT

An aircraft luggage box lock includes a stationary housing and a cover moveable about a rotary axis. The lock includes a locking pin device mountable on the housing, having two parallel locking pins, a catch mountable on the cover having two locking hooks pivotable about a pivot axis for receiving the pins for locking the lock, and a manually actuatable drive device for jointly pivoting the locking hooks away from the locking pins for unlocking the lock. The drive device has a gear rack and a sliding element linearly displaceable against pressure of a spring element. The locking hooks are connected to the gear rack or the sliding element by a knee lever hinged to the closing hook adjacent to the pivot axis thereof in such a way that the lock is openable only by tensile force acting on the hinged point of the knee lever on the locking hook.

8 Claims, 6 Drawing Sheets

(56) References Cited

U.S. PATENT DOCUMENTS

| | | | |
|---|---|---|---|
| 4,973,091 A * | 11/1990 | Paulson et al. | 292/51 |
| 5,305,623 A * | 4/1994 | Kello | 70/338 |
| 5,688,004 A * | 11/1997 | Karge | 292/341.17 |
| 5,951,068 A * | 9/1999 | Strong et al. | 292/39 |
| 6,773,042 B2 * | 8/2004 | Spurr et al. | 292/216 |
| 7,178,839 B2 * | 2/2007 | Tsai | 292/51 |
| 7,837,241 B2 * | 11/2010 | Chung et al. | 292/199 |
| 7,861,976 B2 * | 1/2011 | Holemans | 244/173.3 |
| 7,931,313 B2 * | 4/2011 | Carabalona | 292/251.5 |
| 8,336,929 B2 * | 12/2012 | Halliwell | 292/216 |
| 8,382,168 B2 * | 2/2013 | Carabalona et al. | 292/251.5 |
| 2002/0056296 A1 | 5/2002 | Weinerman et al. | |

* cited by examiner

LOCK FOR A LUGGAGE BOX

BACKGROUND

The invention relates to a lock for a luggage box installed overhead in the cabin of an aircraft, comprising a stationary housing and a lid that is articulated about a rotary axis, having a locking pin device that is or can be arranged on the housing, carrying at least one locking pin, and at least one catch that is or can be mounted on the lid which comprises at least one locking hook that is articulated about a pivot axis for engaging the locking pin to lock the lock, and with a manually actuatable drive device for pivoting the locking hook away from the locking pin to unlock the lock.

The primary function of such a lock is to securely lock and unlock the lid or luggage bin or container of a luggage box in all flight conditions including emergency landing conditions. The drive device within the lock is connected by a mechanical connection member to an operating button or handle, which is mounted on the lid such that it can be operated from outside the luggage box. The operation of the button or handle leads in the known lock to a rotary motion of the mechanical connection means by which the lock is unlocked. Here, the lock is embodied such that an unintentional opening in the loaded or unloaded state of the luggage box is prevented. In aeronautical engineering it is required that the lock is provided with a fail-safe function. For this purpose, a dual lock is provided. In the known lock, this dual locking is achieved on the one hand by a locking pin, which is engaged by a locking hook and on the other hand by a catch pin, which for the opened lid of the luggage box projects from the catch, however upon closing the lid of the luggage box it is pressed into the housing of the catch by the locking pin device. Both the locking pin as well as the catch pin are each individually capable of carry the required loads.

In the known locking mechanism for a luggage box it is problematic that two locks must be operated by the pivotal handle provided in the middle of the lid, which is arranged at one and/or the other end of the lid, for which the pivotal handle and the two shafts must be assembled on one axis for both catches. The pivotal handle performs a rotary motion, which via the shafts is transmitted to the catches of the locks. In each catch the rotary motion is respectively transferred into a pivotal motion of the locking hook. Completely independent therefrom, the catch pin of each lock is brought into its locking position by closing the lid. The locking pin device presses the catch pin, which pass said arrangement, into the housing of the catch. When the locks and the pivotal handle cannot be mounted on one axis, the known lock cannot be used at all. Further, it is problematic that the construction of the shafts and their mounting at the lid required for operating the lock of prior art leads to additional weight, higher expenses for parts, and an increased assembly expense, all of which being extremely undesirable in aeronautical engineering. Finally, in the lock of prior art the locking pin device can be adjusted in two axes. The locking pin simultaneously serves as a contact for a final stop. This is disadvantageous in that with every adjustment of the locking pin device, the contact of the final stop must also be adjusted and set. Additionally, the opening of the lock occurs by pulling the operating handle. Due to the fact that no transmission is provided between the operating handle and the shaft, higher operating forces are required.

A lock for housings, tool boxes, or the like is known from US 2002/00 56 296 A1. This lock has two locking pins on a lid and two locking hooks pivotal about a pivotal axis, which are pivoted jointly at a manually actuated drive arrangement. A luggage box in an airplane must have two locks, which can be operated by a joint operating button. The known lock is unsuitable for this purpose. It can be operated by two push buttons, which are arranged at the left and the right of the lock. The push buttons are connected to the locking hook by a common stiff operating member, with the displacement thereof allowing both locking hooks to be pivoted. Such a lock may not be used for the luggage box of an aircraft because the locking hooks cannot be operated separately. When one locking hook becomes blocked, here the other locking hook would also be blocked.

From GB 2 168 748 A, a lock is known for locking a sliding door to a door frame. The lock comprises two locking hooks respectively pivotal about a pivot axis, which are pivoted jointly via a drive arrangement in the form of a gear rack. This known lock is not suitable for a luggage box of an airplane, either, because both locking hooks, at least in the opening direction, can only be pivoted jointly. When one locking hook becomes blocked in the closed state the other locking hook also could no longer be opened by the drive device.

SUMMARY

The objective of the invention is to provide a lock of the type mentioned at the outset, which avoids the above-mentioned disadvantages and particularly can be used in a luggage box, even when the operating button or handle is not positioned on the axis of the catch.

This objective is attained according to the invention in that the locking pin device carries two locking pins, that the catch comprises two locking hooks each pivotal about a pivotal axis, that the drive arrangement is embodied for a joint pivoting of the locking hook, the drive arrangement comprises a gear rack and a sliding member, arranged successively in a linear guide, pre-stressed by the pressure of a spring element in the direction towards a stop, and displaceable by manual operation against the pressure of the spring element in the direction away from the stop, that the drive arrangement comprises a gear rack, that the gears of the gear rack can engage and be operated by a cable pull.

The lock according to the invention can be unlocked by an operating pull, which is mounted invisibly inside the lid (luggage bin or container). The use of a light operating pull is advantageous with regards to weight. The assembly is uncomplicated because operating pulls can be assembled much easier than shafts and levers made from CFK. The lower weight and the lower assembly expenses are further complemented by lower costs for parts. The primary advantage of the lock according to the invention is that the catch and the operating button or handle are not required to be assembled on a joint axis. The fail-safe function is ensured such that the catch has two locking hooks and that each locking hook engages a locking pin such that, when one of the locking pins or locking hooks malfunctions, the other locking pin and the other locking hook can compensate the entire load. Due to the fact that the two locking hooks are connected to a gear rack and the slider, which in turn only contact under spring pressure but otherwise show no mutual mechanical connection, the lock can also be securely locked when only one locking hook is able to engage the corresponding locking pin. The linear pulling motion created by the operating button is transferred into a rotary motion, which in turn leads to a translational motion of the gear rack and the sliding element, entraining the two locking hooks and pivoting them around their pivotal points. The operation by a cable pull results in a simple, trouble-free, low-weight operation for the gear rack and renders unnecessary the previously used shafts of known luggage boxes. The two locks and the pivotal handle of a luggage box are no longer required to be mounted on one axis.

Advantageous embodiments of the lock according to the invention form the subject matter of the sub-claims.

In one embodiment of the lock according to the invention, the locking hooks are each connected to the gear rack and/or the sliding element via a knee lever, which is linked at the locking hook next to its pivotal axis such that the locking position can only be opened by the effect of a tensile force upon the link of the knee lever at the locking hook. This allows in a simple fashion the fail-safe (dual locking) and positive locking required in aeronautical engineering. The latter is achieved according to the invention such that the knee levers can each be brought into a final locking position in which they are mechanically locked and this way automatically prevent any opening of the lock by overload or vibration.

In another embodiment of the lock according to the invention one of the two knee levers is extended beyond its linking point at the corresponding locking hook and embodied as a preliminary trigger lever to displace the gear rack. In a luggage box in which the lid commonly is simply closed without additionally operating an operating button the locking motion of the lid is ensured by a locking pin contacting the preliminary trigger level such that both locking hooks are opened in order to subsequently accept both locking pins.

In another embodiment of the lock according to the invention, the gear rack comprises an additional gearing, which engages sprockets of an emergency operating lever supported in a pivotal fashion. If the locking hook allocated to the gear rack, for example due to a broken spring element, is blocked in the open position the lock fails to lock, and here a feedback is given to the operating personnel. In this case, the locking hook and thus the lock can manually be locked and unlocked, and subsequently servicing must occur. In this case the luggage can still be removed and it can be ensured that the lock securely locks with only one locking hook. If the locking rack allocated to the gear rack is stuck in the closed position and cannot be unlocked by manual operation with the help of an emergency operating lever, the lock remains locked and must be serviced. This means that the luggage can only be removed after the repair.

In another embodiment of the lock according to the invention the locking pins have different diameters. When one of the locking pins cannot engage the corresponding locking hook it is ensured that at least the other locking hook allocated to the locking pin with the smaller diameter engages said locking pin.

In another embodiment of the lock according to the invention the two locking hooks are embodied identically. Although it is possible to use two locking pins having the same diameter and instead using locking hooks in which the openings that receive the locking pins have a different clear width, however this would be the more expensive solution with regards to warehousing spare parts and assembly.

In another embodiment of the lock according to the invention the locking hook, which can be engaged by the locking pin with the smaller diameter, is allocated to a knee lever embodied as a preliminary trigger lever. This ensures that at least the locking hook connected to the gear rack can in any case be brought into a position in which it can receive the locking hook with the smaller diameter even if for example the spring element might be broken. Here, due to the smaller diameter of the locking pin it is not required for the locking hook and the locking pin to be precisely aligned.

In another embodiment of the lock according to the invention, in order to lock the lock, the locking hook allocated to the knee lever embodied as a preliminary trigger lever, with the help of an emergency lever, can manually engage the locking pin with the smaller diameter even when the other locking pin is not engaged with the other locking hook.

BRIEF DESCRIPTION OF THE DRAWINGS

In the following, the exemplary embodiments of the invention are described in greater detail with reference to the drawings. Shown are FIG. 1 a lock according to the invention in a side view with an opened catch housing and in the locked state, FIG. 2 the lock according to the invention in a view similar to FIG. 1 but in the unlocked state, FIG. 3 the lock according to FIG. 2 but in a view from the rear, FIG. 4 the catch of the lock according to FIGS. 1-3 in an exploded illustration, FIG. 5 a detail of a locking pin device, with for reasons of clarity only two locking pins being shown of FIGS. 1-3, and FIG. 6 a schematic side view of a luggage box of an aircraft.

DETAILED DESCRIPTION OF THE PREFERRED EMBODIMENTS

Figure 1:
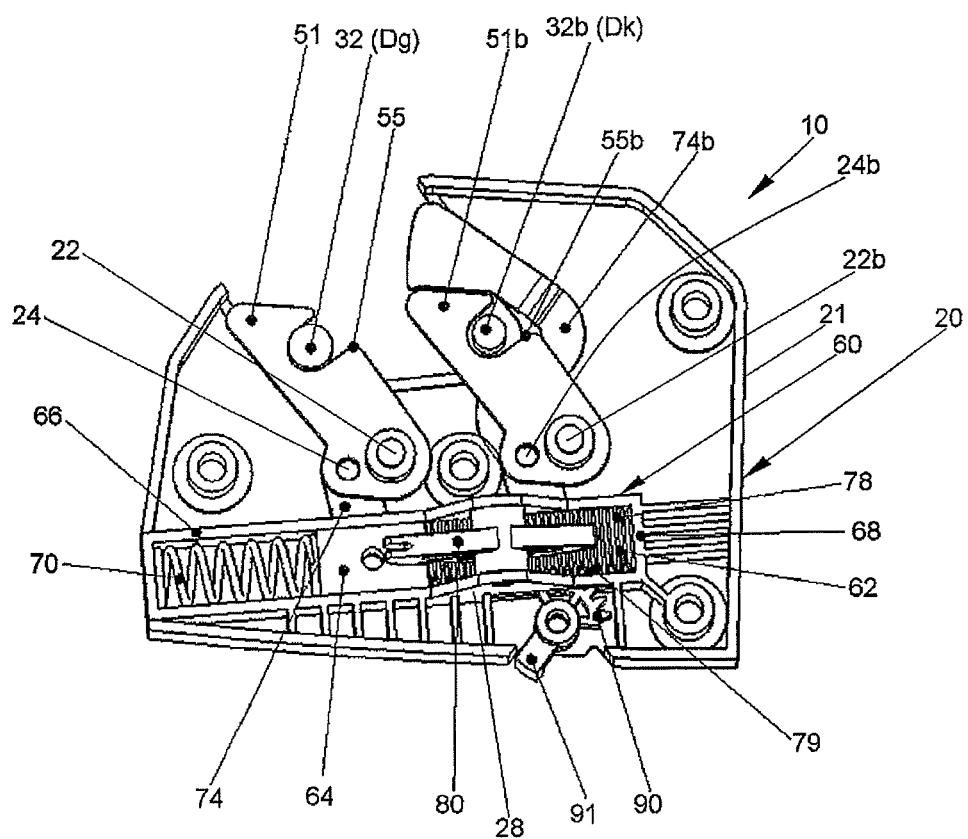
Figure 5:
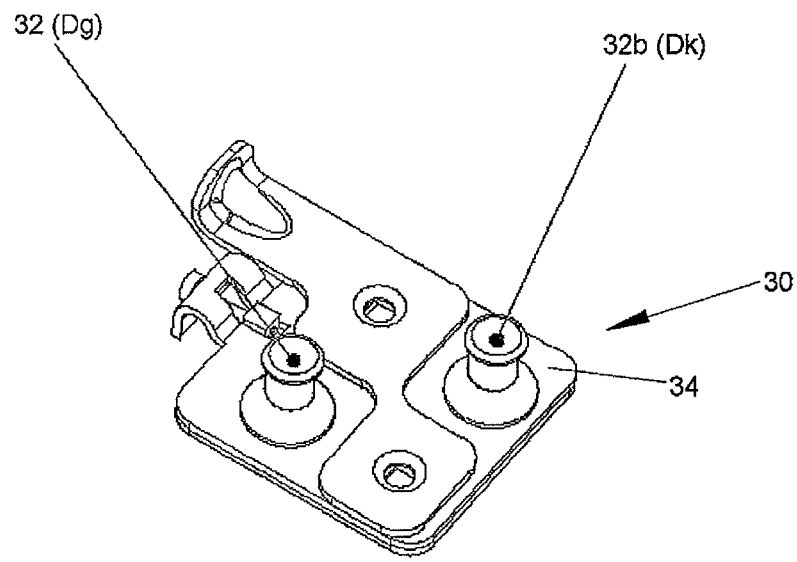

FIG. 1 shows an exemplary embodiment of a lock according to the invention, marked 10 in its entirety. The lock 10 is a catch lock. It comprises a catch 10, in its entirety marked 20, and a locking pin device (keeper) shown in FIG. 5 and marked 30 in its entirety, with FIG. 1 only showing two locking pins 32 and 32b. The lock 10 is preferably intended for a luggage box 40 mounted overhead in a cabin of an aircraft, with a schematic side view being shown in the example of FIG. 6.

Figure 6:
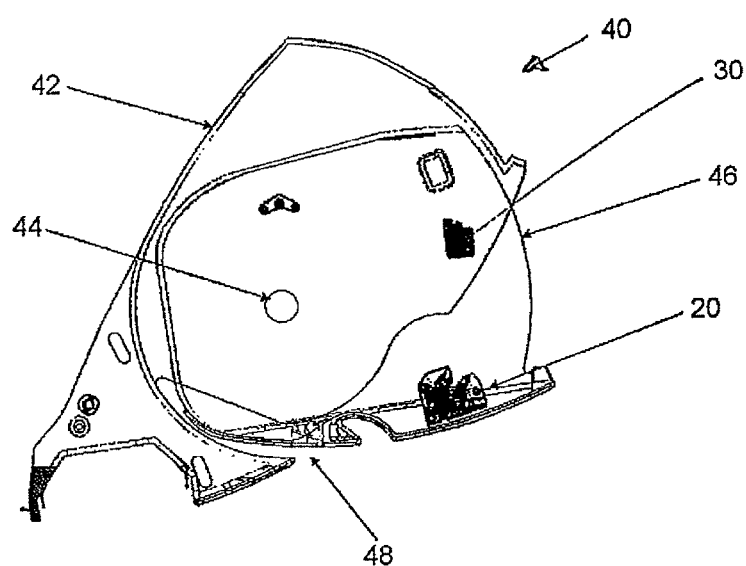

According to the illustration in FIG. 6, the luggage box 40 comprises a stationary housing 42, which is mounted overhead in the cabin of an aircraft. The housing 42 comprises a lid 46 mobile about a rotary axis 44. In the exemplary embodiment shown the lid 46 is a luggage bin or container opening downwards. The locking pin device 30 of the lock 10 is arranged at a lateral wall of the housing 42. The catch 20 of the lock 10 is mounted at a lateral wall of the lid 46 adjacent to the lateral wall of the housing, namely such that when pivoting the lid 46 upwards, the catch 20 and the locking pin device 30 mutually engage each other. At an opposite end of the luggage box 40, not shown, an identically embodied additional lock 10 is provided. The operation of the lock 10 occurs by a push button 48, which is connected via cable pulls 50, one of which being shown in FIG. 4, to the catch 20 of each lock 10. When the lid 46 is pivoted upwards from the position shown in FIG. 6, in which the lock 10 is unlocked, the catch 20 and the locking pin 32, 32b of the locking pin device 30 engage each other, locking the lock 10. By operating the push button 48 the lock is unlocked again, subsequently the lid 46 moves downwards under its own weight or loaded by luggage into the position shown in FIG. 6.

Figure 2:
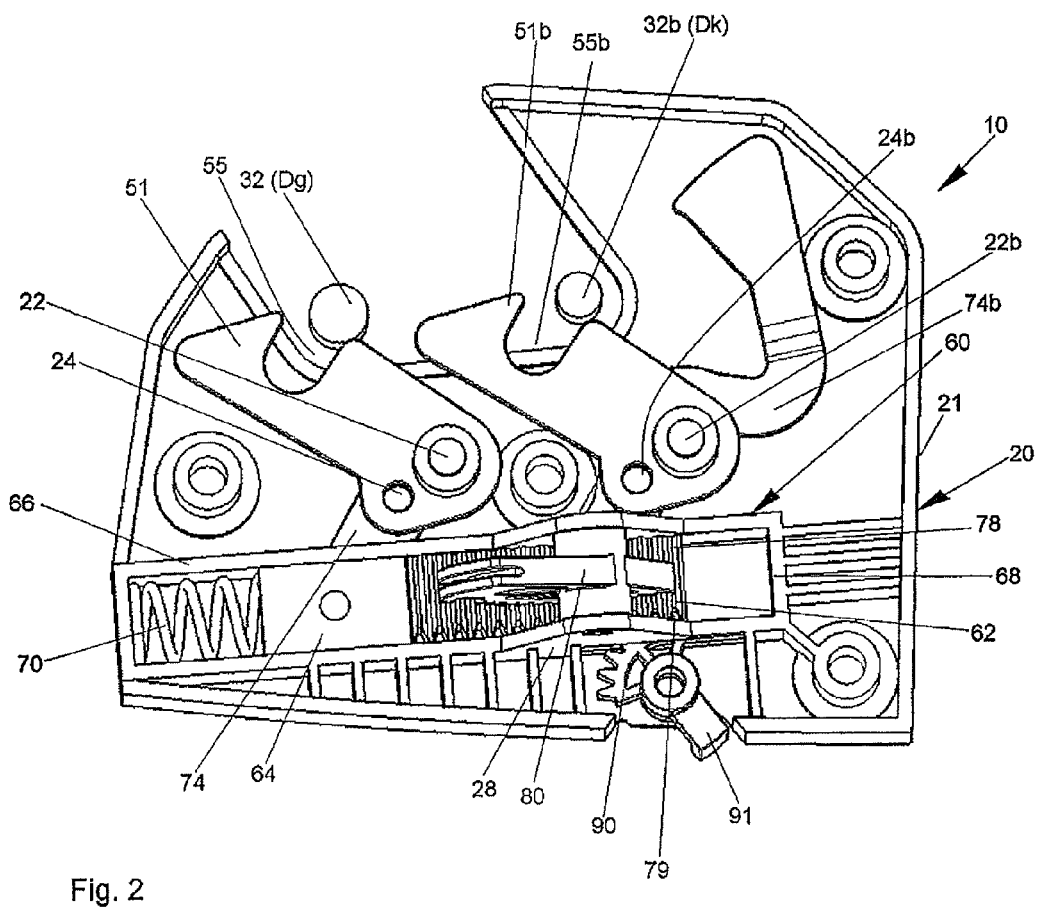
Figure 4:
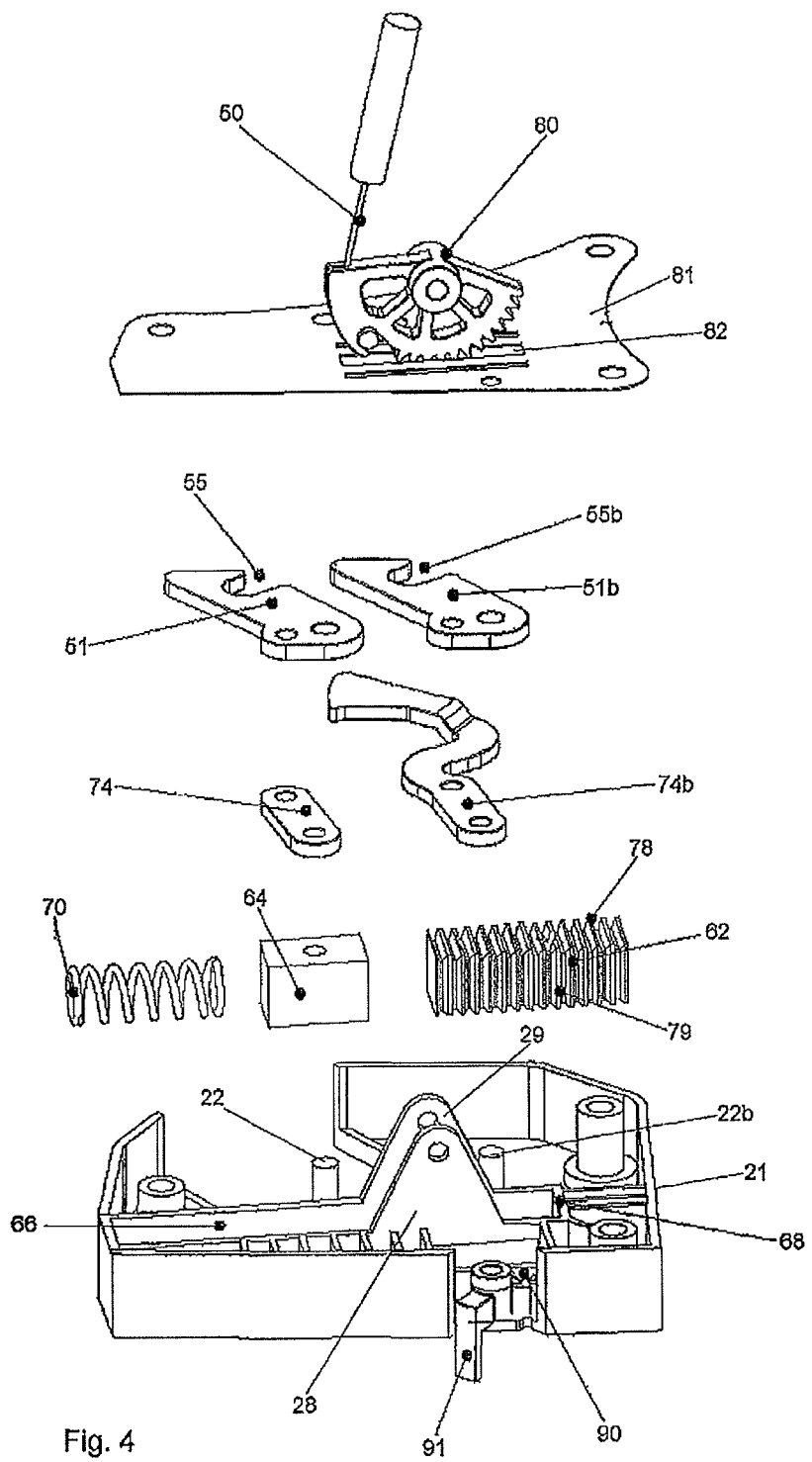

The catch 20 has a housing 21 made from fiberglass— reinforced thermoplastic, with its structure being best discernible in the exploded illustration of the catch 20 in FIG. 4. The catch 20 comprises two locking hooks 51, 51b, each pivotal about a pivotal axis 22 and/or 22b. The locking hooks 51, 51b each have an opening 55 and/or 55b for catching the locking pin 32 and/or 32b. The locking pins 32, 32b are mounted parallel in reference to each other at a base plate 34 of the locking pin device 30, as discernible in FIG. 5. The locking hooks 51, 51b are pivotal from the position shown in FIG. 1, in which the lock 10 is locked, into a position shown in FIG. 2, in which the lock 10 is unlocked, via a drive device marked 60 in its entirety.

The drive device 60 comprises a gear rack 62 and a sliding element 64, arranged successively in a linear guide 66. The linear guide 66 is formed by a channel provided in the housing 21. In FIG. 1 the right end of the channel forms a stop 68 for the gear rack 62. The gear rack 62 and the sliding element 64 are pre-stressed in the direction towards a stop 68 by a spring element 70, also arranged in the channel, so that it tends to assume the position shown in FIG. 1.

Figure 3:
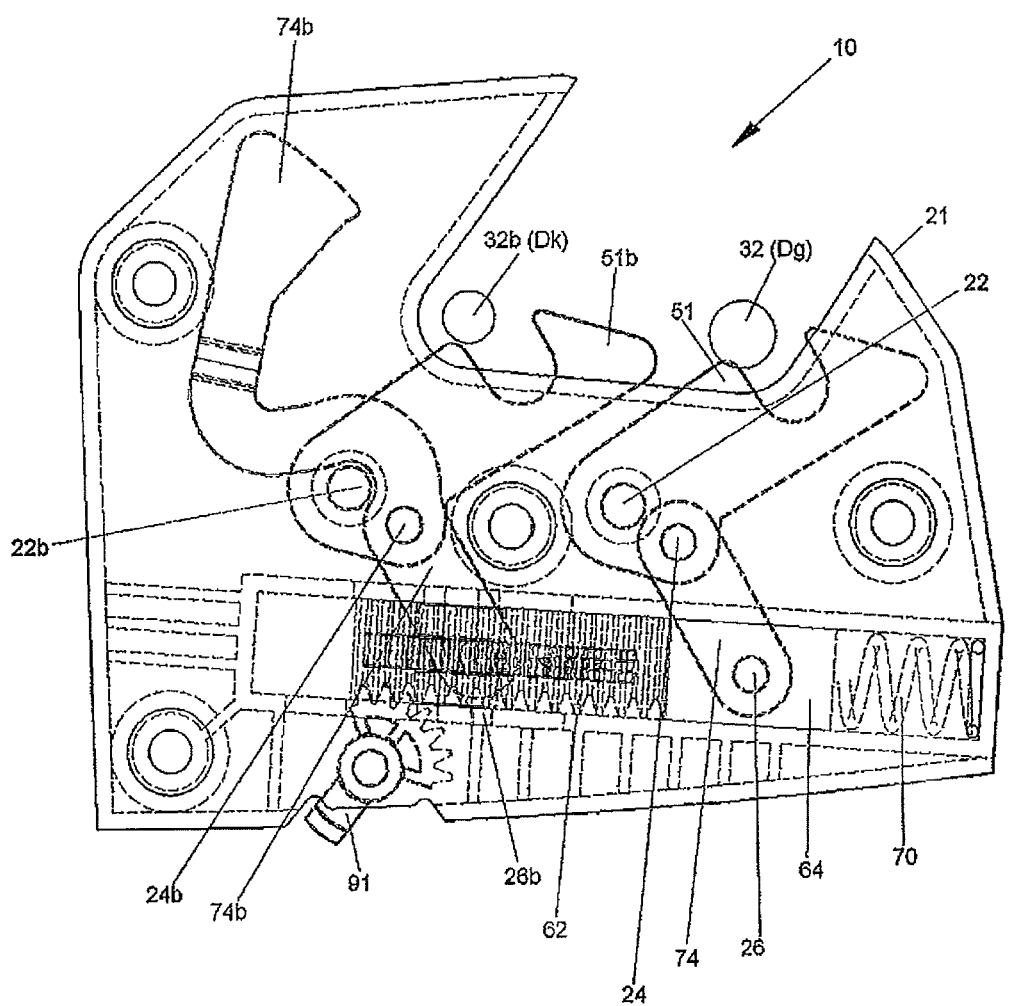

The locking hooks 51, 51b are connected via a knee lever 74 and/or 74b to the gear rack 62 and/or the sliding element 64. The knee levers 74, 74b are each linked to the locking hook 51 and/or 51b next to their pivotal axis 22 and/or 22b at another pivotal axis 24 and/or 24b. The knee levers 74, 74b are visible in their entirety in FIG. 3 in the rear view of the lock 10. In FIG. 3 it is further discernible that the knee lever 74 is extended beyond the pivot point 24 to the locking hook 51 and embodied as a preliminary trigger lever to displace the gear rack 62. The function of the preliminary trigger lever is explained in greater detail in the following.

The drive device 60 is completed by a gear wheel 80, which engages gears 78 of the gear rack 62 and thus can be operated by one of the cable pulls 50 connected to the push button 48. The gear wheel 80 converts the translational motion of the cable pull 50 into a translational motion of the gear rack 62 and the sliding element 64. In the exploded illustration in FIG. 4 additionally a lid 81 made from aluminum is allocated to the housing 21, which is not shown in FIGS. 1 and 2. It covers the top of the linear guide 66 with the elements arranged therein and offers a counter bearing to the axes 22/22b. The gear wheel 80 projects through a central slot 82 in the lid 81 and engages the teeth 89 of the gear rack 62. When via the cable pull 50 a tensile force is applied upon the gear rack 80 it rotates, in FIG. 4 in the clockwise direction, and moves the gear rack 62, against the pressure of the spring element 70, in the illustration in FIG. 1 towards the left in the direction away from the stop 68. The knee levers 74, 74b are each linked, at their end adjacent to the pivotal axis 24, and/or 24b at the side facing away from the gear rack 80, at a pivotal axis 26 and/or 26b with the sliding element 64 and/or the gear rack 68, as best discernible in the rear view of the lock 10 in FIG. 3. The arrangement is made here such that the knee levers 74, 74b in the position shown in FIG. 1, in which the lock 10 is locked, can only be opened again by the impact of a force upon the link of the knee lever 74, 74b at the locking hook 51 and/or 51b. The reason here is that in this position the knee levers 74, 74b each form, together with their corresponding locking hook 51 and/or 51, a so-called positive locking or over-center position, from which they cannot be removed by the impact of a force from the openings 55, 55b of the locking hooks 51 and/or 51b. This positive locking can only be released by displacing the gear rack 62 and the sliding element 64, thus by rotating the gear wheel 80 or by operating an emergency operation lever 91 described in the following. In case of this displacement, at least the locking hook 51b is pivoted in the counter-clockwise direction into the position according to FIG. 2, in which the lock 10 is unlocked.

Due to the above-mentioned positive locking, the locking hooks 51, 51b are additionally locked mechanically in their closed position shown in FIG. 1, in order to prevent any opening by overload or external vibrations. This is achieved by the knee levers 74, 74b being moved beyond their dead center and are thus locked or blocked in their end position. The locking hooks 51, 51b can also be blocked by latches or blocking links, however the embodiment shown is a simpler solution with regards to design and mechanics, because latches or blocking links would require additional parts that are harder to operate under load.

The gear wheel 80 is supported rotational above the gear rack 62 at the housing 21. For this purpose, at both sides of the guide 66, two brackets 28, 29 extend upwards, each of which comprises a bearing bore, in which an axis of the gear wheel 80 is supported in a rotary fashion.

The gear rack 62 comprises, as best discernible in FIG. 4, an additional gearing 79, which engages the gears 90 at the above-mentioned emergency operating lever 91, supported pivotally at the housing 21.

The two locking hooks 51, 5b are embodied identically. However, the locking pins 32, 32b have differently sized diameters Dg and/or Dk. The locking pin 32b therefore has play in the opening 55b in the locking hook 51b when the locking hook 51, 51b is in the position shown in FIG. 1, in which the lock 10 is locked.

Normally, the spring element 70 presses the gear rack 62 via the sliding element 64 to the stop 68, so that the lock 10 is always locked as long as no pressure is applied upon the push button 48. When the spring element 70 due to malfunction, for example a broken spring, cannot be able to do so, in order to lock the lock 10 the locking hook 51b, allocated to the knee lever 74b embodied as a preliminary trigger lever, can be manually made to engage the locking pin 32b with the smaller diameter Dk with the help of the emergency operating lever 91 even when the other locking pin 32 no longer engages the locking hook 51 or can be made to engage it. As soon as the emergency operating lever 91 has brought the locking hook 51b into the position shown in FIG. 1 the knee lever 74b is located in its position of positive locking from which it can only be removed by a renewed operation of the emergency operating lever 91 so that the lock 10 remains in the locked position even after an emergency manual locking. The emergency operating lever 91 can be operated via a narrow gap, which is located between the lateral wall of the lid 46 and the lateral wall of the housing 42, using an object, such as a credit card or the like.

Normally, i.e. when no malfunction is given at the spring element 70 or at another part, which might prevent or hinder the proper operation of the lock 10, the lock with the closed lid 46 of the luggage box 40 is situated in the position shown in FIG. 1. By pulling the cable pull 50, due to an operation of the push button 48, the gear wheel 80 is rotated in the clockwise direction in the illustrations of FIGS. 1 and 2. Thus, the gear rack 62 and with it the sliding element 64 is moved to the left against the pressure of the spring element 70 so that the locking hooks 51, 51b are pivoted in the counter-clockwise direction into the position shown in FIG. 2, in which the lock 10 is unlocked. As soon as the locking pin 32, 32b is released from the openings 55, 55b of the locking hooks 32, 32b the lid 46 moves downwards so that the luggage can be removed from the luggage box 40 or be inserted into said luggage box. When now the lid 46 is folded back upwards the upper left, free end of the knee lever 74b of FIG. 1, formed as a preliminary trigger lever, moves against the locking pin 32b and thus it is pivoted in the clockwise direction, thus moved into the housing 21. Due to the fact that the locking pin 32b impinges the free end of the knee lever 24b, first the positive locking is removed via the preliminary trigger lever. The locking hooks 51, 51b can be moved again in order to allow the lock 10 to snap shut. In FIG. 3 it is discernible that the knee lever 74b here moves the gear rack 62 and the sliding element 64 in the direction away from the stop 68, with here the spring element 70 being stressed. Here, the locking pins 32, 32b move along the locking hooks 51, 51b, until they reach the openings 55, 55b. As soon as they are positioned above the openings 55, 55b the locking hooks 51, 51b are pivoted by the pressure of the spring element 70 into the position shown in FIG. 1, in which the lock 10 is locked again. Here, the emergency operating lever 91 each time follows the motion of the gear rack 62.

The catch 20 is dually latched at the locking pin device 30 during the locking of the lock 10, namely a primary locking occurs between the locking hook 51 and the locking pin 32 with the help of the knee lever 74 and a secondary locking between the locking hook 51b and the locking pin 32b with the help of the knee lever 74b. Neither the primary locking nor the secondary locking can be released by an impact of force upon the locking hooking 51, 51b because in the locking position the knee levers 74, 74b are respectively in positive locking, as explained above.

When the primary locking is blocked in the open position because a malfunction is given in the lock 10, the lock 10 can still be fixed in the locked position by the knee levers 74b with the help of the secondary lock. When in case of a malfunction the locking occurs only via the locking hooks 51b and the locking pin 32, due to the play between the locking hook 51b and the locking pin 32b, the lid slightly projects from the luggage box 40 in the closed state, so that a malfunction is easily discernible from the outside. Due to the fact that the lid 46 is still safely locked the airplane may take off.

LIST OF REFERENCE CHARACTERS

10 Lock
20 Catch
21 Housing
22 Pivotal axis
22b Pivotal axis
24 Pivotal axis
24b Pivotal axis
26 Pivotal axis
26b Pivotal axis
28 Bracket
29 Bracket
30 Locking pin device
32 Locking pin
32b Locking pin
34 Base plate
40 Luggage box
42 Housing
44 Rotary axis
46 Lid
48 Push button
50 Cable pull
51 Locking hook
51b Locking hook
55 Opening
55b Opening
60 Drive device
62 Gear rack
64 Sliding element
66 Linear guide
68 Stop
70 Spring element
74 Knee lever
74b Knee lever
78 Gearing
79 Gearing
80 Gear wheel
81 Lid
82 Slot
90 Gearing
91 Emergency operating lever Dg large diameter
Dk small diameter

The invention claimed is:

1. A lock for a luggage box adapted to be fastened overhead in a cabin of an aircraft, comprising a stationary housing and a lid articulate about a rotary axis, having a locking pin device that is mountable in the housing including at least one locking pin, with a catch that is mountable to the lid with at least one locking hook pivotal to engage the locking pin in order to lock the lock and with a manually operated drive device for pivoting the locking hook away from the locking pin to unlock the lock, the locking pin device (30) includes two of the locking pins (32, 32b), the catch (20) comprises two of the locking hooks (51, 51b) each pivotal about a pivotal axis (22, 22b), the drive device (60) is adapted to jointly pivot the locking hooks (51, 51b), wherein the drive device (60) comprises a gear rack (62) and a sliding element (64) arranged successively in a linear guide (66), pre-stressed under pressure of a spring element (70) in a direction towards a stop (68) and displaceable by manual operation against the pressure of the spring element (70) in a direction away from the stop (68), and wherein the locking hooks (51, 51b) are connected to the gear rack (62) and the sliding element (64), respectively, so that a translational motion of the gear rack (62) and the sliding element (64) entrains the two locking hooks (51, 51b) and jointly pivots them around their pivotal axes (22, 22b) and the displacement device (60) comprises a gear wheel (80) that engages gearing (78) of the gear rack (62) and is operable by a cable pull (50).

2. A lock according to claim 1, wherein the locking hooks (51, 51b) are each connected with the gear rack (62) and the sliding element (64), respectively, via a respective knee lever (74, 74b), linked to each of the locking hooks (51, 51b) via a link next to the pivotal axes (22, 22b) wherein the knee levers (74, 74b) are each displaceable into an overcenter locking position in which they are mechanically locked so that the locking position is only openable by a tensile force upon the link of the respective knee lever (74, 74b) at the locking hook (51, 51b).

3. A lock according to claim 2, wherein one (74) of the two knee levers (74, 74b) is extended beyond its link to the corresponding locking hook (51b) and is embodied as a preliminary trigger lever for displacing the gear rack (62).

4. A lock according to claim 3, wherein the gear rack (62) comprises an additional gearing (79) engaging gearing (90) of a pivotally supported emergency operating lever (91).

5. A lock according to claim 3, wherein the locking pins (32, 32b) have differently sized diameters (Dg, Dk).

6. A lock according to claim 5, wherein the two locking hooks (51, 51b) are embodied identical.

7. A lock according to claim 6, wherein the locking hook (51b) which can be engaged by the locking pin (32b) with a smaller of the two diameters (Dk) is allocated to the knee lever (74b) embodied as the preliminary trigger lever.

8. A lock according to claim 4, wherein for locking the lock (10), the locking hook (51b) allocated to the knee lever (74b) embodied as the preliminary trigger lever, can be manually made to engage the locking pin (32b) which has a smaller diameter (Dk) than the other locking pin (32) using the emergency operating lever (91), even when the other locking pin (32) is not or cannot be made to engage the other locking hook (51).

* * * * *